United States Patent
Maclaughlin

(10) Patent No.: US 9,581,701 B2
(45) Date of Patent: Feb. 28, 2017

(54) IMPACT PROTECTION FOR WIRELESS DIGITAL DETECTOR GLASS PANEL

(71) Applicant: Carestream Health, Inc., Rochester, NY (US)

(72) Inventor: Scott T. Maclaughlin, Pittsford, NY (US)

(73) Assignee: Carestream Health, Inc., Rochester, NY (US)

(*) Notice: Subject to any disclaimer, the term of this patent is extended or adjusted under 35 U.S.C. 154(b) by 29 days.

(21) Appl. No.: 14/571,527

(22) Filed: Dec. 16, 2014

(65) Prior Publication Data

US 2016/0169714 A1 Jun. 16, 2016

(51) Int. Cl.
*G01T 1/20* (2006.01)
*G01T 1/00* (2006.01)

(52) U.S. Cl.
CPC .. *G01T 1/00* (2013.01); *G01T 1/20* (2013.01)

(58) Field of Classification Search
CPC ......... G01D 11/26; G01D 11/245; G01T 1/20; G01T 1/00; G21K 2004/10
See application file for complete search history.

(56) References Cited

U.S. PATENT DOCUMENTS

| | | | |
|---|---|---|---|
| 3,562,366 A | 2/1971 | Sohl | |
| 3,914,145 A * | 10/1975 | Forler | C03C 27/10 156/98 |
| 6,278,118 B1 * | 8/2001 | Homme | G01T 1/2018 250/367 |
| 7,189,972 B2 * | 3/2007 | Ertel | G01T 1/1644 250/370.09 |
| 8,569,704 B2 | 10/2013 | Tredwell | |
| 8,772,728 B2 * | 7/2014 | Tredwell | G01T 1/2018 250/370.01 |
| 9,211,565 B2 * | 12/2015 | Jagannathan | B05D 3/12 |
| 2003/0071228 A1 * | 4/2003 | Bergh | C09K 11/7733 250/484.4 |
| 2003/0183749 A1 * | 10/2003 | Tsutsui | G01T 1/2928 250/214.1 |
| 2003/0183777 A1 * | 10/2003 | Struye | C09K 11/025 250/484.4 |
| 2004/0124362 A1 * | 7/2004 | Hennessy | G01T 1/2002 250/370.11 |
| 2006/0261286 A1 * | 11/2006 | Homme | G01T 1/202 250/483.1 |
| 2007/0138400 A1 * | 6/2007 | Ertel | G01T 1/1644 250/370.11 |

(Continued)

FOREIGN PATENT DOCUMENTS

JP WO 2014013770 A1 * 1/2014 ............... G21K 4/00

OTHER PUBLICATIONS

Caruso, M., et al., "Solvent-Promoted Self-Healing Epoxy Materials" Macromolecules 2007, 40, 8830-8832.*

(Continued)

*Primary Examiner* — Wyatt Stoffa

(57) ABSTRACT

A digital radiography detector has a glass panel that is encased within a housing and that has, formed on a first surface, circuitry that provides image data of a subject in response to ionizing radiation passed through the subject, wherein at least a second glass panel surface on the exterior of the detector has a flexible cover sheet that is configured to absorb impact force against the detector.

13 Claims, 10 Drawing Sheets

(56) References Cited

U.S. PATENT DOCUMENTS

| | | | |
|---|---|---|---|
| 2007/0290146 A1* | 12/2007 | Fukui | G21K 4/00 250/484.4 |
| 2008/0011961 A1* | 1/2008 | Shoji | C09K 11/616 250/370.11 |
| 2008/0026334 A1* | 1/2008 | Williamson | C09D 4/06 430/496 |
| 2008/0035859 A1* | 2/2008 | Molteni | G21K 4/00 250/484.4 |
| 2008/0149852 A1* | 6/2008 | Shoji | B29C 66/001 250/483.1 |
| 2008/0157001 A1* | 7/2008 | Kudo | G03B 42/02 250/484.4 |
| 2009/0067582 A1* | 3/2009 | Feke | A61B 6/583 378/207 |
| 2009/0122959 A1* | 5/2009 | Jadrich | G01T 1/20 378/91 |
| 2011/0024642 A1 | 2/2011 | Tredwell et al. | |
| 2012/0153172 A1* | 6/2012 | Sumi | G01T 1/244 250/369 |
| 2013/0105696 A1* | 5/2013 | Shaw | G21K 4/00 250/361 R |
| 2013/0220514 A1* | 8/2013 | Jagannathan | B05D 3/12 156/67 |
| 2015/0008330 A1* | 1/2015 | MacLaughlin | G01T 1/00 250/394 |
| 2015/0048259 A1* | 2/2015 | Yamamoto | B05D 3/067 250/483.1 |
| 2015/0168568 A1* | 6/2015 | Jonishi | G01T 1/2018 250/208.2 |
| 2015/0204985 A1* | 7/2015 | Jonishi | G21K 4/00 250/361 R |

OTHER PUBLICATIONS

Parylene Properties and Characteristics, downloaded from http://vp-scientific.com/parylene_properties.htm, Sep. 15, 2016.*

R.A. Allaire, et al., Fracture Analysis of the Glass Scoring Process—Technical Paper, Corning—Display Technologies, Nov. 2004, 5 pages, TIP 308.

* cited by examiner

IMPACT PROTECTION FOR WIRELESS DIGITAL DETECTOR GLASS PANEL

FIELD OF THE INVENTION

The invention relates generally to the field of x-ray imaging and more particularly relates to apparatus and methods for providing impact protection for a portable wireless digital detector.

BACKGROUND

With the advent of portable wireless digital radiography (DR) detectors, significant new opportunities are available for using x-ray imaging in various environments, including medical and dental applications and non-destructive testing (NDT) applications, such as inspection of pipe welds on oil/gas lines and aircraft structures, for example. Hospitals and other healthcare facilities in particular have expanded capability for obtaining x-ray images, including images obtained at the patient bedside. Unlike conventional radiographic image detectors, the wireless DR detectors can be positioned about the patient in a number of positions, without the concern for extending wires between the detector and image acquisition and power electronics. Portability with wireless operation also makes these devices suitable for use in veterinary imaging, since the DR detector can be flexibly positioned and there are no external wires that could be chewed or otherwise damaged during handling and positioning about the subject. It is also possible to use the DR detector in various outdoor environments, under a range of weather conditions for both medical and non-medical applications.

In conventional use as well as in veterinary, outdoor, and industrial and security imaging environments, the portable DR detector can be susceptible to damage in normal handling and use. The DR detector circuitry is formed on a glass panel substrate that is encased in a protective housing. Even though the glass panel is carefully packaged and supported within its housing, however, there remains some risk of damage. Some amount of rough handling is possible; the detector may be inadvertently dropped, stepped on, or subject to other shocks, mechanical stresses, point loading, and impact in any of the various environments in which it is operated.

Practical requirements for high portability, low weight, reduced dimensional profile, and versatile use run counter to the need to protect the relatively large glass substrate that supports sensitive circuitry inside the DR detector. Applying conventional approaches for buffering the internal glass panel from any possible type of impact could prevent the DR detector from being usable in one or more of its intended environments or applications. Thus, there is a need to achieve a reasonable balance between usability of the wireless DR panel and protection of its internal components.

SUMMARY

Embodiments of the present disclosure address the need for improved impact protection for a portable wireless DR detector. Advantageously, embodiments of the present disclosure provide an added measure of resiliency to impact without compromising dimensional and weight requirements and without noticeable effect on imaging performance.

These objects are given only by way of illustrative example, and such objects may be exemplary of one or more embodiments of the invention. Other desirable objectives and advantages inherently achieved by the may occur or become apparent to those skilled in the art. The invention is defined by the appended claims.

According to an embodiment of the present disclosure, there is provided a digital radiography detector with a glass panel that is encased within a housing and that has, formed on a first surface, circuitry that provides image data of a subject in response to ionizing radiation passed through the subject, wherein at least a second glass panel surface on the exterior of the detector has a flexible cover sheet that is configured to absorb impact force against the detector.

According to another embodiment, there is disclosed, in a digital radiography detector, a housing, photosensitive cells for capturing a radiographic image, and a top side outermost transparent panel, and a transparent flexible sheet in contact against at least a first major exterior surface of the top side transparent panel and compressed between the edges of the panel and the housing where the panel is secured to the housing.

According to another embodiment, there is disclosed a method for forming a digital radiography detector including forming a detector panel with one or more glass panels, wherein circuitry formed on a first surface of the one or more glass panels is energizable to provide image data of a subject in response to ionizing radiation passed through the subject, and coupling to at least a second surface of the one or more glass panels that is an exterior surface of the detector panel, a flexible cover sheet that absorbs impact force. The detector panel is encased with its cover sheet within a housing.

According to another embodiment, there is provided a method for forming a digital receiver detector. The method includes cutting a glass section from a supply glass panel, applying a liquid filler to at least the edges of the glass section formed by the step of cutting, and treating the glass section by allowing the liquid filler to penetrate microcracks in the edges of the glass section over a period of time, and curing the liquid filler.

This brief summary of the invention is intended only to provide a brief overview of subject matter disclosed herein according to one or more illustrative embodiments, and does not serve as a guide to interpreting the claims or to define or limit the scope of the invention, which is defined only by the appended claims. This brief summary is provided to introduce an illustrative selection of concepts in a simplified form that are further described below in the detailed description. This brief summary is not intended to identify key features or essential features of the claimed subject matter, nor is it intended to be used as an aid in determining the scope of the claimed subject matter. The claimed subject matter is not limited to implementations that solve any or all disadvantages noted in the background.

For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The drawings below are intended to be drawn neither to any precise scale with respect to relative size, angular relationship, relative position, or timing relationship, nor to any combinational relationship with respect to interchangeability, substitution, or representation of a required implementation.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE EMBODIMENTS

Figure 1:
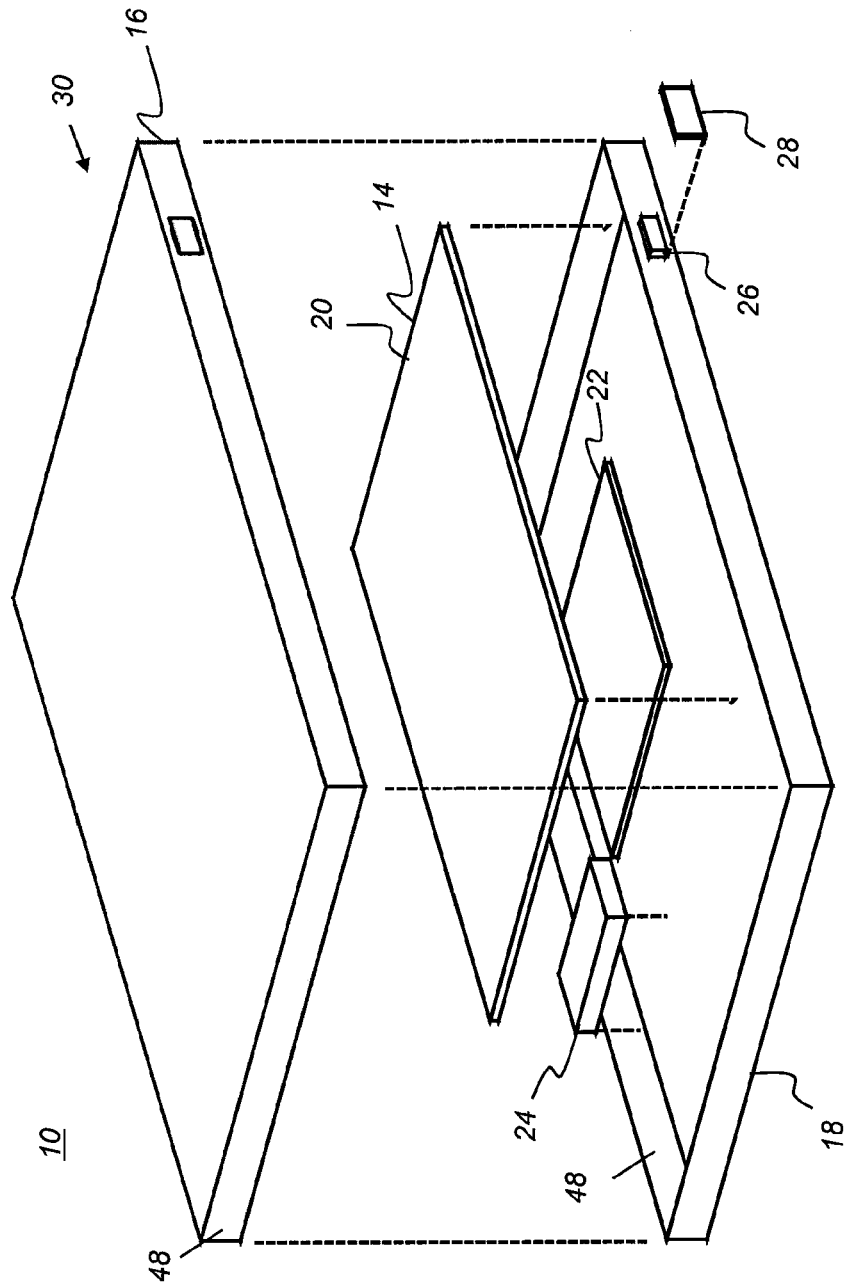
FIG. 1 is an exploded view that shows some of the components of a digital radiography (DR) detector.

The following is a detailed description of the preferred embodiments, reference being made to the drawings in which the same reference numerals identify the same elements of structure in each of the several figures. Where they are used herein, the terms "first", "second", and so on, do not necessarily denote any ordinal, sequential, or priority relation, but are simply used to more clearly distinguish one element or set of elements from another, unless specified otherwise. As used herein, the term "energizable" relates to a device or set of components that perform an indicated function upon receiving power and, optionally, upon receiving an enabling signal. The term "actuable" has its conventional meaning, relating to a device or component that is capable of effecting an action in response to a stimulus, such as in response to an electrical signal, for example. In the context of the present disclosure, the term "subject" refers to the patient or other object that is being imaged using a radiography imaging apparatus and, in optical terms, can be considered equivalent to the "object" of the corresponding imaging system. Various spatially relative terms such as "above," "below," "top," "bottom," "height," "depth," "width," and "length," etc. may be used in the present disclosure to facilitate description of various embodiments. The relative terms are defined with respect to a conventional orientation of a structure as described and do not necessarily represent an actual orientation of the structure in manufacture or use. The use of such terms in following detailed description is, therefore, not to be taken in a limiting sense.

The exploded view of FIG. 1 shows, in simplified form, some of the electrically active internal components of a DR detector 10 that are protected within a housing 30 formed using top and bottom covers 16 and 18. A detector panel 20 formed on one or more glass sections or glass panels 14 includes scintillator and imaging components that are energizable for generating image data from received ionizing radiation. A circuit board 22 provides supporting components for data acquisition and wireless transmittal to an external host processor. A battery 24 provides source power for detector 10 operation. An external port 26 is provided for functions such as wired data transfer and battery charging and has an optional cover plate 28, which may be a rubber seal or other waterproofing material. In addition to components shown are also a number of interconnecting cables, supporting fasteners, cushioning materials, and other elements needed for packaging and protecting the DR detector circuitry. Housing covers 16 and 18 are fastened together along mating surfaces 48, for example.

Figure 2:
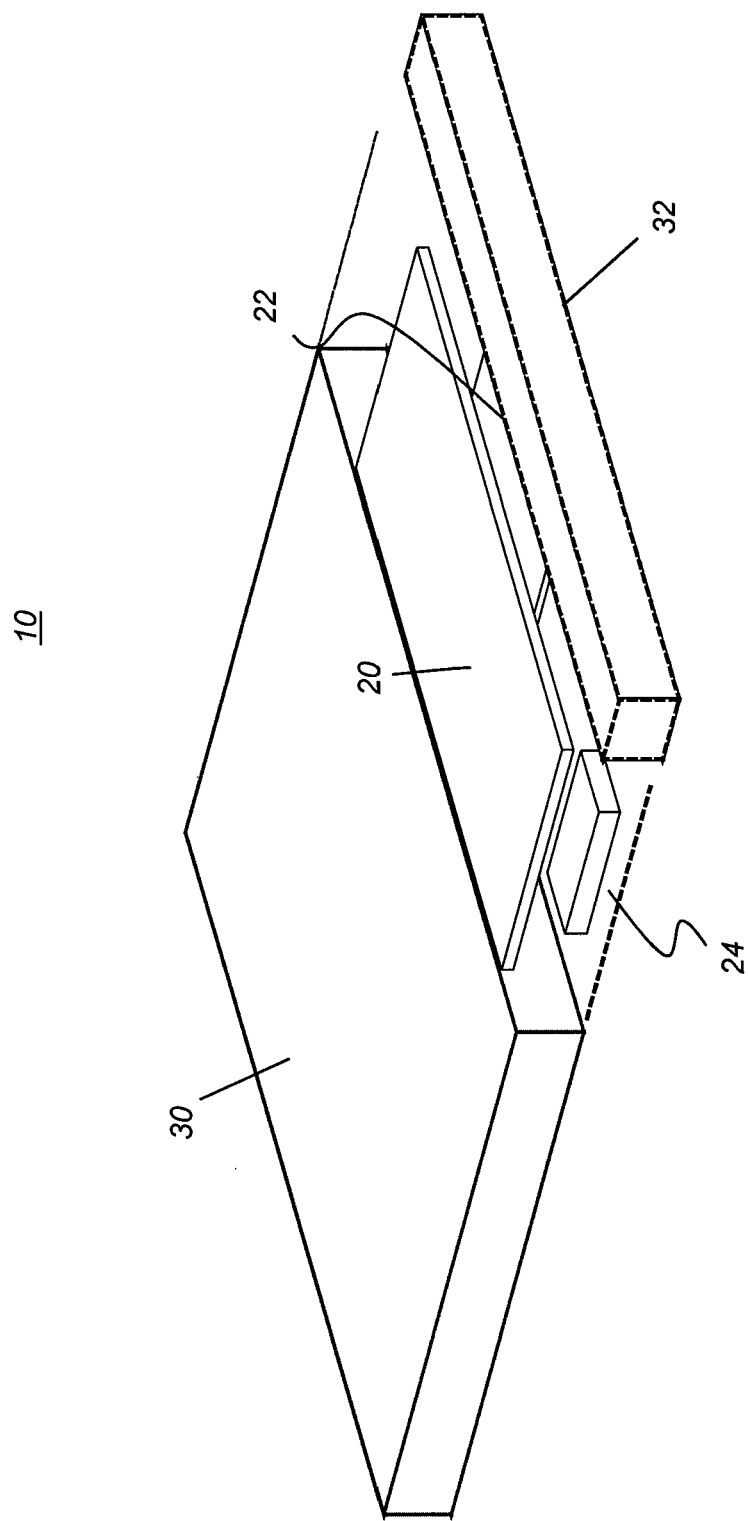
FIG. 2 is an exploded view that shows an alternate embodiment for DR detector packaging.

The exploded view of FIG. 2 shows an alternate embodiment of DR detector 10, in which detector panel 20, circuit board 22, and battery 24, along with interconnection and other support components, slide into a housing 30. A lid 32 then fastens to housing 30, such as being inserted into the housing 30, for example, and provides a protective seal.

Detector panel 20 has one or more substrate sections, glass panels 14, of silicate glass or other silicon-based material upon which the sensing circuitry for detecting incident radiation is formed as an array of sensing elements. Sensing circuitry can be, for example, thin-film transistor (TFT) structures that are formed by depositing patterns of charge-doped materials onto the glass substrate. Circuitry can be formed on an inner surface of glass panel 14 or on an external or exterior surface. Exemplary disclosures that describe various aspects of DR detector panel 20 include commonly assigned U.S. Patent Application Publication No. 2013/0220514 by Jagannathan et al., entitled "Method of Manufacturing Digital Detectors"; U.S. Patent Application Publication No. 2011/0024642 by Tredwell et al., entitled Radiographic Detector Formed on Scintillator"; and U.S. Pat. No. 8,569,704 to Tredwell, entitled "Digital Radiographic Detector Array Including Spacers and Methods for Same". In the context of the present disclosure, treatment applied to exterior glass panel 14 surfaces is considered equivalent to treatment provided to detector panel 20 surfaces, since detector panel 20 can be formed from one or more adjacently disposed glass panels 14. Circuitry and scintillator material can be protectively sandwiched between two or more adjacent glass panels 14, for example.

Figure 3A:
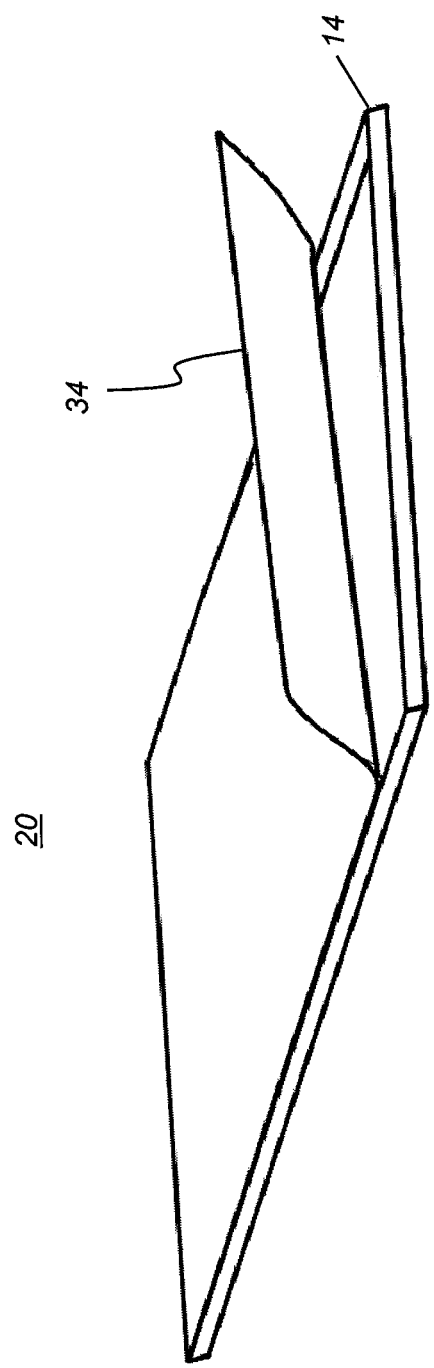
FIG. 3A is a perspective view that shows adhesive application of a cover sheet to the glass panel.
Figure 3B:
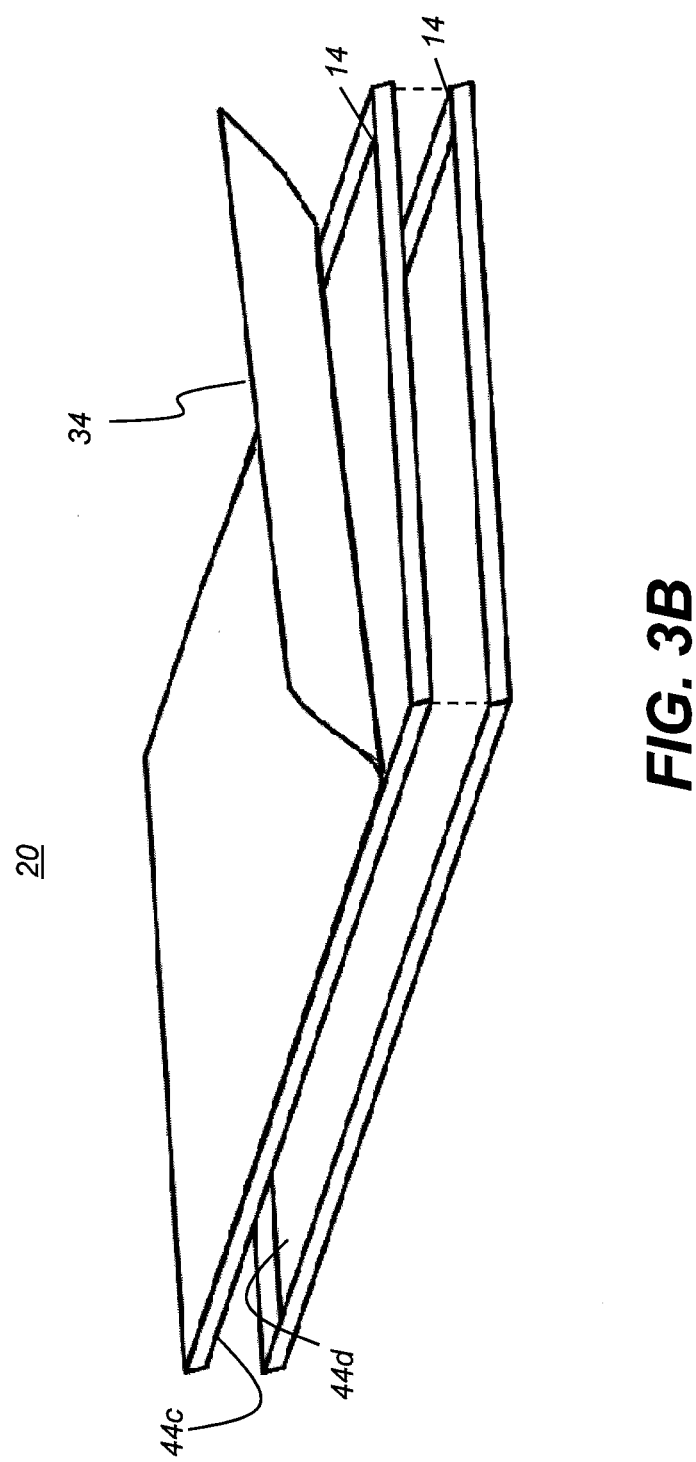
FIG. 3B is a perspective view that shows adhesive application of a cover sheet to the glass panel for a detector panel that is formed from multiple glass panels.
Figure 4:
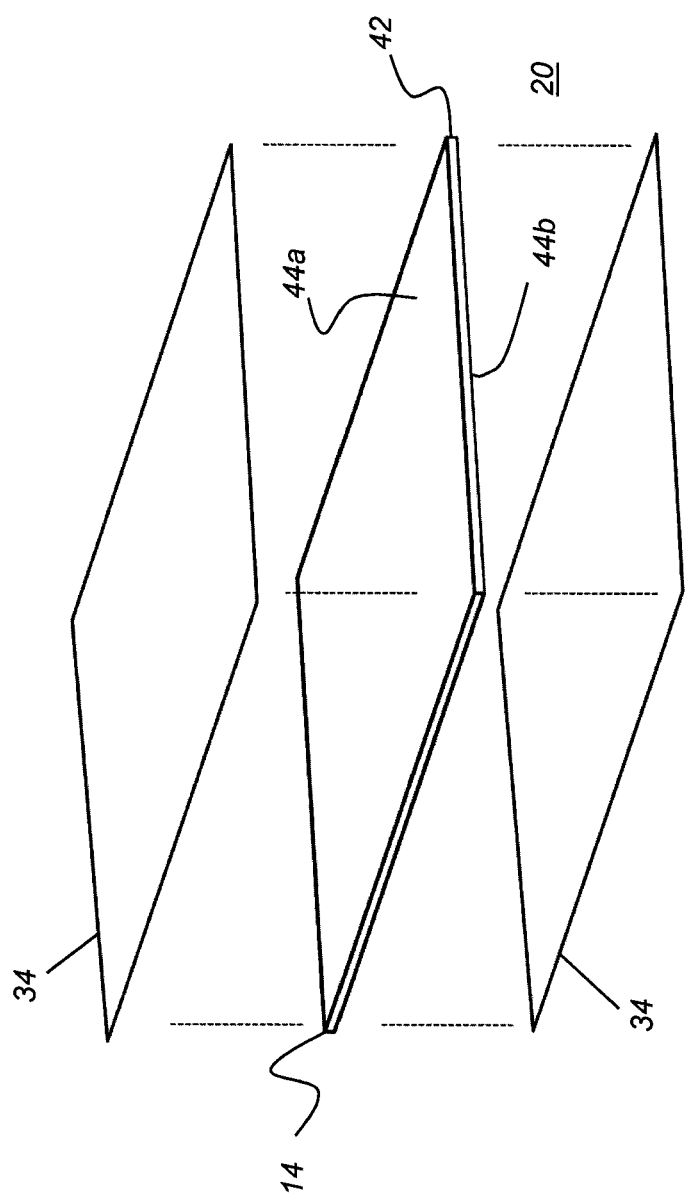
FIG. 4 is a perspective view that shows application of two cover sheets to respective surfaces of the glass panel that holds DR detector circuitry.

An embodiment of the present disclosure provides a measure of impact protection to one or more exterior surfaces of glass panel 14 of the detector panel 20 by applying an impact-absorbing covering in the form of a sheet that is positioned directly against a major exterior surface of glass panel 14 surface or adhesively coupled to the exterior glass panel 14 surface. Referring to the perspective views of FIGS. 3A-3B, there is shown a cover sheet 34 that is being adhesively coupled to glass panel 14 on an exterior surface of detector panel 20. Cover sheet 34 may be adhered to glass panel 14 wherein detector 20 is formed from two or more adjacently disposed glass panels, such as a first glass panel that has detector circuitry on an inner surface 44c and a second glass panel that has a layer of scintillator material on an inner surface 44d, facing the circuitry surface, for example. A side portion of cover sheet 34 is shown raised in FIGS. 3A and 3B. The exploded view of FIG. 4 shows application of upper and lower cover sheets 34, one on each major surface 44a and 44b of exterior surfaces of detector panel 20. Major exterior surfaces 44a and 44b are those opposite, outside surfaces of detector panel 20 that are parallel to the plane of the glass that forms the detector, as the term "plane" is generally understood in practice. This plane is also parallel to the imaging plane.

Figure 5:
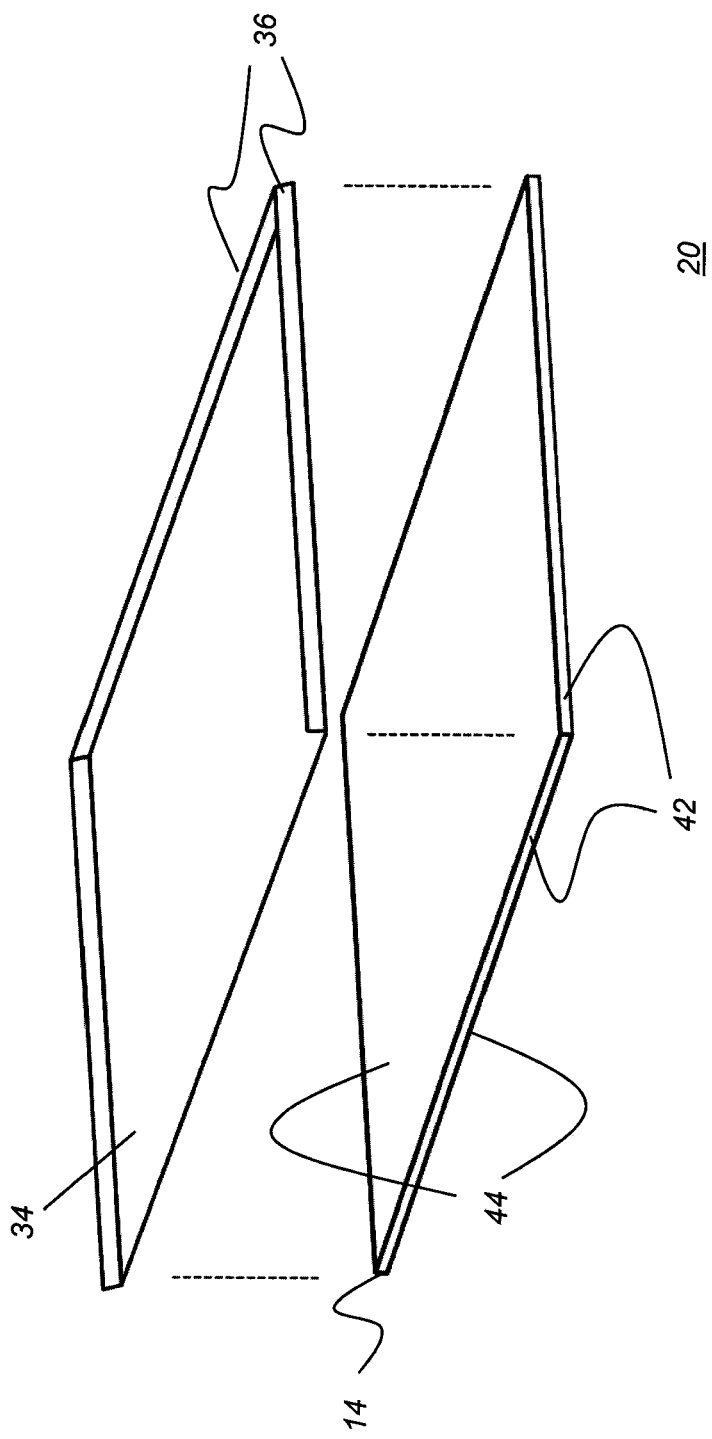
FIG. 5 is a perspective view showing a cover sheet with folds for covering side edges.
Figure 6:
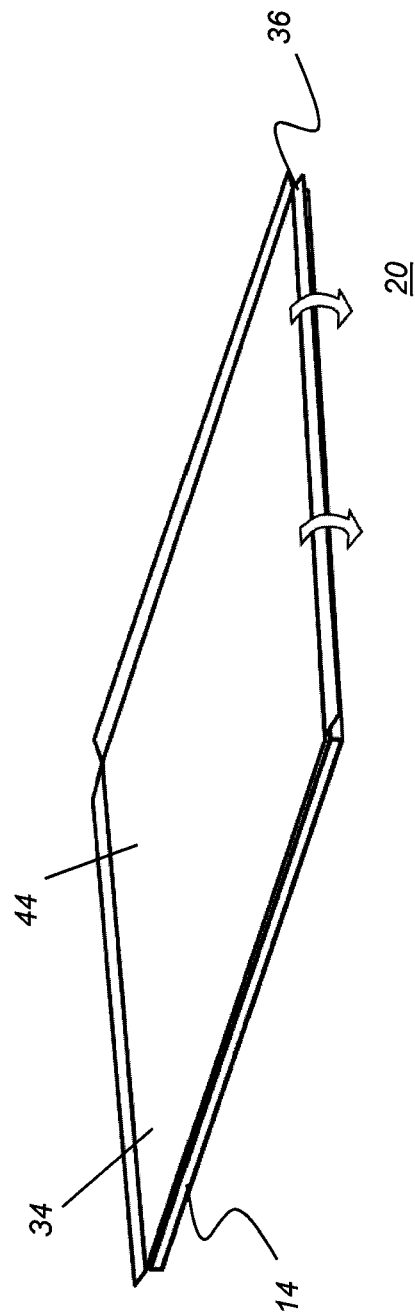
FIG. 6 is a perspective view showing a cover sheet with folds configured for covering a side edge.

Cover sheet 34 may also wrap around glass panel 14, including both major exterior surfaces 44a and 44b and around narrow edges 42. As shown in the perspective exploded view of FIG. 5, a single continuous cover sheet 34 can have one or more regions folded into flaps 36 that fold down over edges 42 of glass panel 14 to protect these edges of the detector panel 20 from impact. FIG. 6 shows, using arrows, one of the flaps 36 being folded downward to cover one edge of panel 14 after the front or rear major exterior surface 44 of detector panel 20 that is parallel with the imaging plane has been covered.

It can be readily appreciated that there are a number of options and configurations for adhering or otherwise coupling cover sheet 34 against one or more exterior surfaces of glass panel 14 of detector panel 20. Contact adhesive can be used, along with smoothing techniques for removal of trapped air bubbles. Other types of adhesive can be employed, including adhesives that are applied to the surface of cover sheet 34 or to the surface of glass panel or to both surfaces. Adhesives that are heat-cured or light-cured can also be utilized, provided that the heat or light energy applied for curing is not deleterious to detector panel 20 circuitry. Cover sheet 34 can alternately be applied as a type of coating, such as by spraying, rolling, or smoothing with a blade, for example. The applied coating is then cured to form a covering over the surface; curing can use heat or light energy, or curing in air, for example. Cover sheet 34 can alternately be fitted along edges where detector panel 20 is secured to the housing, such as compressed between the edges of the panel and the housing where the panel is secured to the housing.

Cover sheet 34 can be formed from a multilayer polymer material that has a top layer that is sufficiently rigid to spread impact force along the plane of the cover sheet 34; a middle layer that comprises an impact absorbing polymer, such as a material that is used in fabrication of aircraft cockpit glass or bullet-proof glass, for example; and a bottom layer for use closest to the glass panel 14 surface, formed from a soft polymer that dampens impact force and absorbs impact energy. The middle layer can be BulletShield™ impact absorbing polymer manufactured by BASF of Ludwigshafen, Germany, for example. Other layers can be added, formed from similar or different materials as needed. One example of a type of protective cover sheet that can be used is the Impact Shield from Tech21, London, UK.

Advantageously, cover sheet 34 does not need to be transparent to visible light and can be opaque, blocking visible light. The polymer materials used should have low density so that they provide negligible attenuation to the x-ray radiation.

According to an alternate embodiment of the present disclosure, cover sheet 34 is pressed against the surface of glass panel 14 of detector panel 20 without adhesive coupling. Mechanical pressure is applied against cover sheet 34 at various points. Protective cover sheet 34 can be compressed between edges of the glass panel 14 and housing 30, for example.

According to an alternate embodiment of the present disclosure, cover sheet 34 is positioned between detector circuitry on detector panel 20 and the scintillator layer or layers that generate light in response to received radiation energy. In this case, cover sheet 34 is made from a material that is transparent to the wavelengths of light that are emitted from the scintillator.

Other methods for reducing the likelihood of impact damage include treatment of edge surfaces of the glass substrate following a glass-cutting operation used to fabricate the glass substrate. Glass cutting is generally performed as an early fabrication step, prior to forming the circuitry on the substrate. The glass is scored with a scribing tool, typically of diamond or carbide composition, forming a shallow linear crack along the glass surface. Bending is then used to propagate the linear crack through the width of the glass plate to break the glass in along the scoring. Cutting glass typically results in some damage along the edges of the glass, in the form of tiny cracks, or microcracks, that can be barely visible even under low magnification. Characteristics of microcracks from glass cutting are described, for example, by R. A. Allaire and T. Ono in a Technical Information Paper from Corning, Inc. entitled "Fracture Analysis of the Glass Scoring Process", November 2004, currently available online as filename TIP_308.pdf.

One concern with microcracks is that these small cracks potentially form nuclei for larger cracks that extend from the edges inward along the glass panel 14. Continued loading and cycling due to thermal, mechanical, and vibration effects can tend to cause these tiny cracks to propagate further along the glass plate, eventually resulting in a crack that could damage detector panel 20 circuitry.

Conventional strategies for preventing or healing microcracks along the edges of a cut glass plate include grinding and polishing. While these methods can help to reduce problems related to microcracks, they can also tend to have unintended side-effects, such as adding particulate glass and abrasive materials to the glass major surface on which circuitry is formed. Static charge introduced as a side-effect of the polishing process can also be detrimental, causing the surface to attract and hold unwanted particulate material. The added step of finishing glass edges in conventional ways can thus have disappointing results and can be time-consuming and costly.

Figure 7:
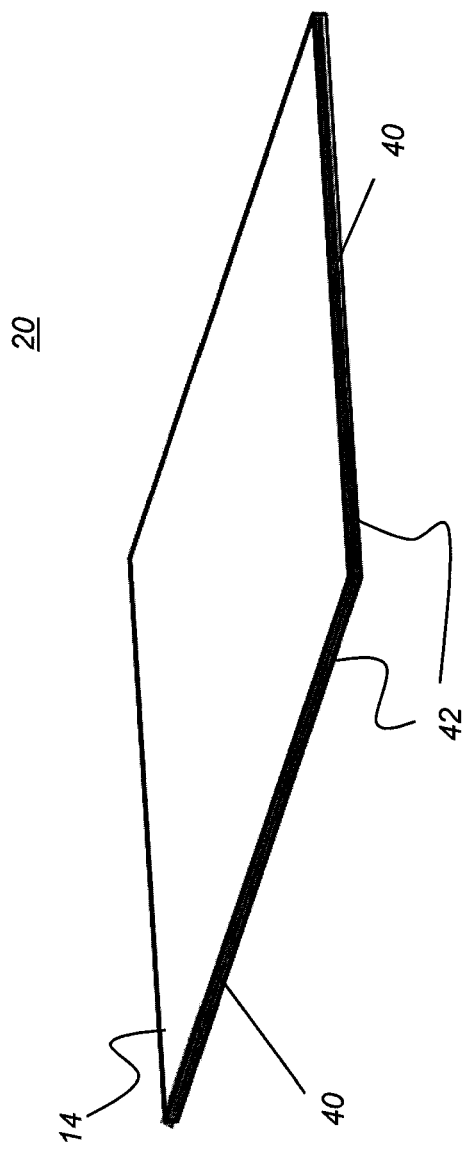
FIG. 7 is a perspective view that shows a glass plate with a protective edge treatment.

An embodiment of the present disclosure addresses the problem of edge microcracks by applying a sealant or filler material to the edges of the glass sheet that is used to form glass panel 14. The sealant or filler material can be applied to one or more edges of the glass sheet, such as along edges formed by glass cutting, or can be applied to all edges of the glass sheet. The perspective view of FIG. 7 shows glass panel 14 with a filler 40 applied along at least two edges 42.

Filler 40 can be any of a number of materials that penetrate microcracks, bond to the glass, and help to forestall the spreading of surface faults from microcracks. Suitable filler 40 materials include, but would not be limited to, epoxy resins. Epoxy resins, also termed polyepoxides, are a well-known class of reactive prepolymers and polymers which contain epoxide groups. In curing, these materials form a strong polymer bond that reduces the likelihood of fracture spreading in glass.

Epoxy resins cure or harden by cross-linking. These resins are typically provided in two-part formulations, with the epoxy material that is mixed before application with a co-reactant, also termed a curative or hardener. Some typical co-reactants used for this purpose include polyfunctional amines, acids (and acid anhydrides), phenols, alcohols, and thiols. Alternately, epoxy resins can be a single-part formulation, cross-linked by homopolymerisation. Curing can be facilitated by exposure to air or exposure to light energy, including ultraviolet (UV) illumination.

Methods for treatment of holes or defects in the glass surface itself, using epoxy or similar materials, are known and described, for example in U.S. Pat. No. 3,562,366 to Sohl entitled "Method of repairing windshields"; and in U.S. Pat. No. 3,914,145 to Forler et al. entitled "Method and Apparatus for Repairing Cracks in Plate Glass".

Unlike windshield or other glass applications, the filler material that is applied for treating edges of glass panel 14 need not be transparent. Application of filler 40 (FIG. 7) along the one or more cut edges 42 can be by roller, dipping, spraying, tube application, applying a bead of the material, or using a blade or other structure. Filler 40 can be compressed against the treated edges and surface during or following application, so that the material fills voids, microcracks, and defects in the cut glass structure.

According to an embodiment of the present invention, an epoxy resin and suitable hardener are mixed and deposited within a tray. The edges of cut glass panel 14 are fed through the tray for acquiring a coating of the epoxy. The coated glass panel 14 is then dried and the epoxy is cured under UV illumination.

Advantageously, the use of filler 40 can help to reduce the likelihood of crack spreading through glass panel 14 because of microcracks or other problems caused in glass cutting and sizing. Other types of filler 40 can be used, including silicones and other materials. So-called "self-healing" materials can alternately be used for filler 40. Self-healing materials include various types of polymer and composite materials that exhibit some level of capability for automatic molecular-level realignment in response to fracture or other damage.

According to an embodiment of the present disclosure, there is provided a method comprising cutting a glass section from a supply glass panel; applying a liquid filler to at least the edges of the glass section formed by the step of cutting; and allowing the liquid filler to penetrate microcracks in the edges of the glass section over a period of time, including curing the liquid filler. After curing, the glass section is inserted into a detector housing, wherein the detector housing is in contact against one or more edges of the glass section.

Filler 40 can be used prior to the fabrication of circuitry onto glass panel 14. Alternately, filler 40 can be added to glass panel 14 after the deposition of thin-film transistor (TFT) or other circuit-forming materials.

Figure 8:
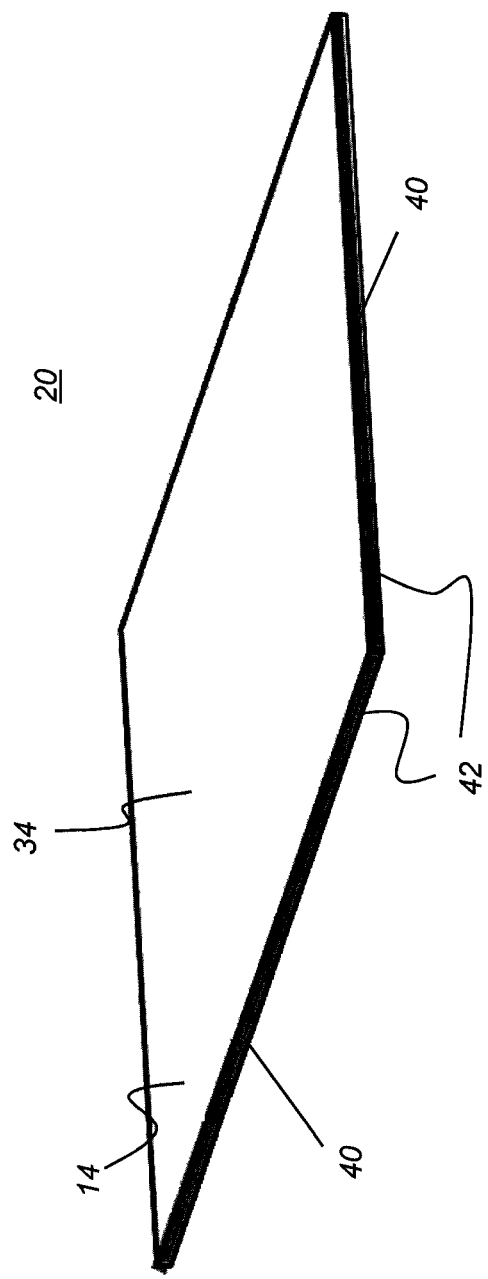
FIG. 8 is a perspective view of a DR detector in which a glass plate has both an edge treatment and a cover sheet.

Methods for edge treatment and surface treatment of detector panel 20 can be combined in order to provide enhanced protection from handling and impact damage. The perspective view of FIG. 8 shows glass panel 14 that has an applied cover sheet 34 and has then been treated along cut edges 42 using an epoxy-based filler.

Figure 9:
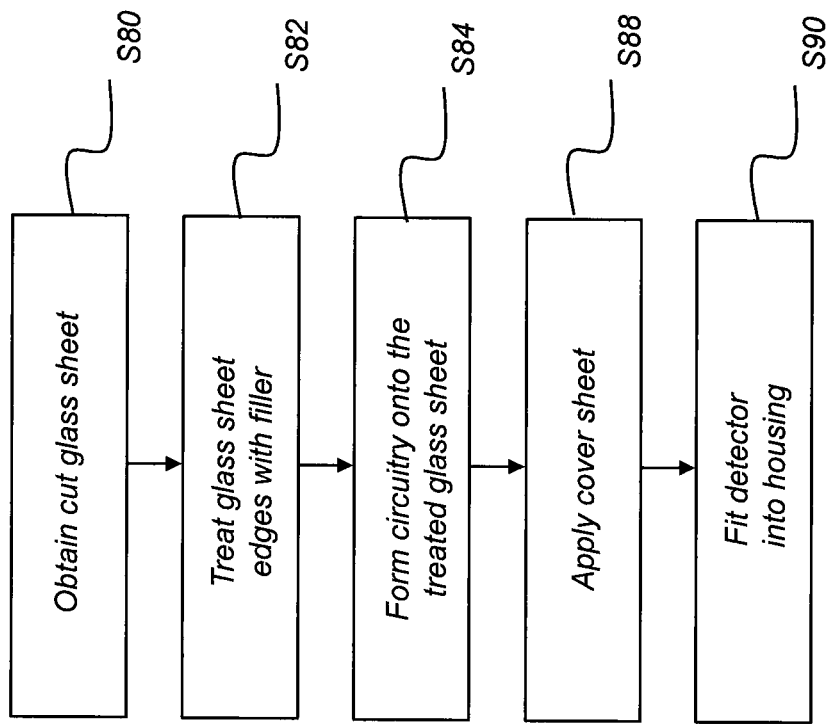
FIG. 9 is a logic flow diagram that shows processes in a sequence for forming and protecting a DR detector according to an embodiment of the present invention.

The logic flow diagram of FIG. 9 shows processes in a sequence for forming and protecting a DR detector according to an embodiment of the present invention. In an initial step S80, a cut glass sheet is obtained for use as a surface substrate in the DR detector. In an edge treatment step S82, an epoxy-based or other filler is used to treat the cut glass sheet. The filler is applied along at least one cut edge of the glass sheet. A circuit forming step S84 is then executed, forming circuitry onto the edge-treated glass sheet. The scintillator layer is then applied to the circuitry. An application step S88 then applies a cover sheet onto one or more surfaces of the detector. A fitting step S90 then packages the DR detector into a housing, as was shown earlier with respect to FIGS. 1 and 2.

The invention has been described in detail, and may have been described with particular reference to a suitable or presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for forming a digital receiver detector, the method comprising:
   treating a glass sheet by applying a liquid filler to one or more edges of the glass sheet, wherein the liquid filler includes a material different than a material in the glass sheet;
   allowing the liquid filler to penetrate microcracks in the edges of the glass sheet over a period of time;
   curing the liquid filler;
   forming circuitry on the treated sheet of glass;
   assembling the sheet of glass with a scintillator in order to form a digital detector;
   applying a cover sheet onto the digital detector; and
   fitting the digital detector into a housing.

2. The method of claim 1 wherein applying the cover sheet comprises using an adhesive.

3. The method of claim 1 wherein applying the cover sheet comprises compressing the cover sheet against the digital detector.

4. The method of claim 1, further comprising rolling, compressing, dipping, spraying, applying a bead of, or using a blade to apply, the filler material to the one or more edges of the glass sheet.

5. A digital radiography detector comprising:
   a glass panel that is encased within a housing and that has, formed on a first surface, circuitry that provides image data of a subject in response to ionizing radiation passed through the subject, wherein at least a second glass panel surface on the exterior of the detector has a multilayer cover sheet that is configured to absorb impact force against the detector, the multilayer cover sheet comprising polymer material having a top layer sufficiently rigid to spread the impact force, a middle layer having an impact absorbing polymer, and a bottom layer in contact with the glass panel having a soft polymer to absorb impact energy; and
   wherein at least one edge of the glass panel comprises microcracks that have absorbed a filler material in liquid form, wherein the filler material comprises a material different than a material in the glass panel.

6. The detector of claim 5 wherein the filler material is an epoxy resin.

7. The detector of claim 5 wherein the filler material is a self-healing material.

8. The detector of claim 5, wherein the cover sheet is adhesively coupled to the second glass panel surface on the exterior of the detector.

9. The detector of claim 5, wherein the cover sheet is mechanically compressed against the second glass panel surface on the exterior of the detector.

10. The detector of claim 5, wherein the cover sheet is transparent.

11. The detector of claim 5, wherein the cover sheet is opaque to visible light.

12. The detector of claim 5, wherein the cover sheet is applied as a coating and cured.

13. The detector of claim 5, wherein the cover sheet is in contact against more than one exterior surface of the detector.

\* \* \* \* \*